(12) United States Patent
Peret et al.

(10) Patent No.: US 12,420,746 B2
(45) Date of Patent: Sep. 23, 2025

(54) WIPER SYSTEM FOR A GLAZED SURFACE (71) Applicant: VALEO SYSTEMES D'ESSUYAGE, La Verriere (FR)

(72) Inventors: Adrien Peret, La Verriere (FR); Frederic Bretagnol, La Verriere (FR); Marcel Trebouet, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 152 days.

(21) Appl. No.: 18/042,656

(22) PCT Filed: Jul. 30, 2021

(86) PCT No.: PCT/EP2021/071411
§ 371 (c)(1),
(2) Date: Feb. 23, 2023

(87) PCT Pub. No.: WO2022/043002
PCT Pub. Date: Mar. 3, 2022

(65) Prior Publication Data
US 2023/0382353 A1 Nov. 30, 2023

(30) Foreign Application Priority Data
Aug. 31, 2020 (FR) ...................... 2008850

(51) Int. Cl.
*B60S 1/56* (2006.01)
*B60S 1/08* (2006.01)
*B60S 1/44* (2006.01)

(52) U.S. Cl.
CPC ................. *B60S 1/566* (2013.01); *B60S 1/08* (2013.01); *B60S 1/44* (2013.01)

(58) Field of Classification Search
CPC .......... B60S 1/56; B60S 1/566; B60S 1/3404; B60S 1/583; B60S 1/44; B60S 1/26; B60S 1/08
(Continued)

(56) References Cited

U.S. PATENT DOCUMENTS 1,561,320 A * 11/1925 Glidric ..................... B60S 1/08
15/250.29
3,968,537 A * 7/1976 Wagenhofer .......... B60S 1/3404
15/250.003
(Continued)

FOREIGN PATENT DOCUMENTS

CN 103847700 A 6/2014
CN 208498399 U 2/2019
(Continued)

OTHER PUBLICATIONS

Japanese Patent Office_Japanese office action regarding the application No. 2023-513681 dated Jan. 5, 2024.
(Continued)

*Primary Examiner* — Andrew A Horton
(74) *Attorney, Agent, or Firm* — Valeo Systemes d'Essuyage (57) ABSTRACT

The present invention relates to a wiper system for a glazed surface, with at least one main body which includes at least one blade rubber designed to come into contact with the glazed surface and at least one embedded motorized member for setting in motion, which is configured to drive a linear movement of the main body along the glazed surface.

10 Claims, 4 Drawing Sheets

(58) Field of Classification Search
USPC .......................................... 15/250.24, 250.29
See application file for complete search history.

(56) References Cited

U.S. PATENT DOCUMENTS

| | | | | |
|---|---|---|---|---|
| 4,945,600 | A | * | 8/1990 | Gastmann ................. B60S 1/38 15/250.07 |
| 5,005,248 | A | * | 4/1991 | Bonar ...................... A47L 1/02 15/250.04 |
| 6,009,592 | A | | 1/2000 | Habba |
| 6,163,921 | A | * | 12/2000 | Takayama ................ B60S 1/20 15/250.16 |
| 7,424,765 | B1 | * | 9/2008 | Stevens ................ B60S 1/0497 15/250.3 |
| 9,975,523 | B1 | * | 5/2018 | Canela ..................... B60S 1/18 |
| 11,628,807 | B2 | * | 4/2023 | Wells ................... B60S 1/3418 701/36 |
| 2003/0000040 | A1 | * | 1/2003 | Trajkovic ............. B60S 1/3404 15/250.24 |
| 2018/0201230 | A1 | * | 7/2018 | Schafer .................... B60S 1/56 |

FOREIGN PATENT DOCUMENTS

| | | | | |
|---|---|---|---|---|
| DE | 10216869 | A1 | | 11/2003 |
| EP | 1457398 | A2 | * | 9/2004 ........... B60S 1/3404 |
| EP | 3804866 | A1 | | 4/2021 |
| GB | 2173995 | A | * | 10/1986 ............... B60S 1/08 |
| JP | S61282151 | A | | 12/1986 |
| JP | 2008137503 | A | | 6/2008 |

OTHER PUBLICATIONS

European Patent Office, International Search Report (with English translation) and Written Opinion of corresponding International Application No. PCT/EP2021/071411, dated Oct. 13, 2021.

* cited by examiner

WIPER SYSTEM FOR A GLAZED SURFACE

TECHNICAL FIELD

The present invention relates to the field of wiper systems intended for motor vehicles. More particularly, the present invention is especially applicable to cleaning glazed surfaces that protect sensors of driving assistance systems.

BACKGROUND OF THE INVENTION

Vehicles, in particular motor vehicles, increasingly comprise automated systems that are notably driving assistance systems. Such driving assistance systems comprise notably one or more module(s) for detecting the surroundings of the vehicle and parameters external to this vehicle, and also at least one control unit configured to interpret the information thus gathered and to make decisions that need to be made as a result of this information.

Therefore, it will be understood that it is particularly important to check that these detection modules are operating properly throughout the lifetime of the vehicle. Notably, these detection modules are usually arranged on the outside of the vehicle, for example carried on the body of this vehicle, and may for example get dirty, possibly making it difficult, if not impossible, for these detection modules to acquire information. It is therefore necessary to provide a wiper system capable of effectively removing detritus, dirt, organic matter and other disruptive elements. One solution is to install a system for sweeping the glazed surface.

SUMMARY OF THE INVENTION

The wiper systems currently in use conventionally comprise at least one wiper blade equipped with a blade rubber which comes into contact with the glazed surface to be cleaned, this wiper blade being driven in rotation via a wiper arm, which itself is connected to a motor, for example an electric motor.

One drawback of the wiper systems currently in use is their bulk, and notably the bulk caused by the presence of the wiper arm and the motor, which is conventionally arranged in the vicinity of the glazed surface.

Also known are linear-sweeping wiper systems, in which a wiper blade is arranged at the end of a wiper arm driven in translational movement. The translational movement driving means are arranged on an edge of the glazed surface and may consist of rams that push the arm, or rotary motors associated with a suitable system of link rods which convert the rotational movement of the motor into a translational movement of the blade-bearing arm. In each of these cases, the lateral bulk, over the perimeter of the glazed surface to be cleaned, is significant, this having a particularly negative effect on the detection modules as mentioned above, specifically in a context in which the number of these detection modules is increasing.

The present invention falls within this context and aims to solve at least the drawback mentioned by proposing a simplified wiper system, that is to say a wiper system with a reduced number of parts and the arrangement of which makes it possible to reduce the total bulk of the wiper system.

One subject of the present invention thus relates to a wiper system for a glazed surface, comprising at least one main body, the main body comprising at least one blade rubber designed to come into contact with the glazed surface and at least one embedded motorized member for setting in motion, which is configured to drive a linear movement of the main body along the glazed surface.

In this instance, "embedded motorized member for setting in motion" is understood to mean the fact that the motorized member for setting in motion is displaced at the same time as the elements that it contributes to driving. Thus, according to the invention, the motorized member for setting in motion is designed to drive the displacement of the main body, and therefore of the blade rubber also borne by this main body, along the glazed surface, that is to say facing this glazed surface. Since the motorized member for setting in motion is embedded in the main body, it will be understood that this member for setting in motion is also displaced, as a whole, along the glazed surface. Since the blade rubber is designed to be arranged in contact with the glazed surface, it will be understood that the movement of the main body allows this blade rubber to sweep the glazed surface so as to clean it. Such an arrangement also makes it possible to limit the bulk of the wiper system by avoiding having to provide, at the periphery of the glazed surface, a location dedicated to receiving the motorized member for setting in motion.

"Linear movement" is understood to mean a translational movement, that is to say a movement along a straight line. Thus, the main body of the wiper system, and therefore the blade rubber that it bears, is designed to be driven, along this straight line, in at least a first displacement direction and at least a second displacement direction counter to the first displacement direction.

According to one feature of the invention, the wiper system may comprise at least one fixed guide means configured to guide the linear movement of the main body along the glazed surface.

According to one feature of the invention, the member for setting in motion comprises at least one electric motor, and the main body comprises at least one electrical energy storage device designed to make it possible to supply electrical energy to the electric motor. Advantageously, the main body may comprise at least one connector electrically connected to the at least one electrical energy storage device, the wiper system comprising at least one charging terminal configured to be electrically connected to the at least one connector. In this instance, "electrical energy storage device" is understood to mean a device designed to accumulate electrical energy during a charging phase, and then to return this electrical energy in order to drive the rotation of the electric motor, which makes it possible to implement a phase of cleaning the glazed surface, that is to say which makes it possible to displace the main body and thus to sweep this glazed surface by way of the blade rubber. In order to enable a new, subsequent cleaning phase, the electrical energy storage device must execute a new charging phase during which it accumulates electrical energy via the charging terminal, which itself is electrically connected to an external energy source. It will be understood that this is merely an example of implementation of the invention which does not limit the scope thereof. For example, provision could be made that the electrical energy storage device executes a charging phase only after completion of a predetermined number of cleaning phases, or else that this charging phase is implemented solely when the vehicle equipped with the wiper system according to the invention is stopped.

According to one feature of the invention, the wiper system comprises at least one pressing member for pressing the blade rubber against the glazed surface. Advantageously, the presence of such a pressing member makes it possible to improve the effectiveness of the cleaning performed by the wiper system according to the invention by ensuring effective sweeping throughout the displacement of this blade rubber along the glazed surface.

According to a first exemplary embodiment of the invention, the wiper system comprises the at least one fixed guide means for the main body, this at least one fixed guide means being formed by at least one notched belt, and the motorized member for setting in motion comprises at least the electric motor and at least one toothed wheel designed to be driven in rotation by the electric motor, this at least one toothed wheel engaging with the at least one notched belt. According to one feature of this first exemplary embodiment, the at least one toothed wheel and the at least one notched belt have dimensions such that these parts are able to mesh in a rack-and-pinion type connection. It will thus be understood that, as it turns, the toothed wheel is displaced along the notched belt with which it is engaged. Since this toothed wheel is borne by the main body of the wiper system, it drives the main body, and thus also the blade rubber it bears, along with it. Optionally, the fixed guide means may comprise two notched belts distributed on either side of the glazed surface and the member for setting in motion may comprise at least two toothed wheels, each toothed wheel being engaged with one of the notched belts. Advantageously, according to this option, the two toothed wheels may be rotationally connected such that the electric motor drives the simultaneous rotation of these two toothed wheels, thus ensuring a smooth displacement of the main body along the glazed surface.

According to a feature of the first exemplary embodiment, the pressing member for pressing the blade rubber is borne by the at least one notched belt, the pressing member for pressing the blade rubber comprising at least one elastic return device designed to stretch the at least one notched belt, and the at least one toothed wheel engaged with the notched belt is arranged between this notched belt and the glazed surface. Since the notched belt is stretched by the elastic return device, it exerts a bearing force against the toothed wheel interposed between this notched belt and the glazed surface, which makes it possible to move this toothed wheel close to the glazed surface, as well as the rest of the main body which bears this toothed wheel. Since the main body likewise bears the blade rubber, this pressing member thus makes it possible to press the latter against the glazed surface. In other words, the pressing member is configured to make it possible to move the main body close to the glazed surface such that the wiper blade borne by this main body comes into contact with the glazed surface.

According to another feature of this first exemplary embodiment, the wiper system comprises at least one tensioning member for tensioning the at least one notched belt arranged upstream of the toothed wheel with respect to a direction of displacement of the main body along the glazed surface. Specifically, it will be understood that, to enable the displacement of the toothed wheel along the notched belt, this notched belt must remain straight and stretched, that is to say extend in a direction parallel to a direction of displacement of the toothed wheel, to act as a rack. For example, this at least one tensioning member comprises at least one ring arranged around the at least one toothed wheel, at least one first plate and at least one second plate which extend from this at least one ring, the at least one first plate and the at least one second plate being arranged spaced apart from one another and defining a zone for receiving the at least one notched belt. These first and second plates extend in two mutually parallel directions, these two directions also being parallel to the direction of displacement of the toothed wheel.

As mentioned above, the main body can be displaced in at least two opposite displacement directions. According to an example of implementation of the invention, the wiper system may advantageously comprise at least two tensioning members, a first tensioning member being designed to make it possible to tension the notched belt upstream of the main body in the first direction of displacement of this main body and a second tensioning member being designed to make it possible to tension the notched belt upstream of the main body in the second direction of displacement of this main body. Optionally, the first tensioning member and the second tensioning member may be in one piece, that is to say form a single assembly which cannot be separated without causing damage to the first tensioning member and/or the second tensioning member. According to this option, the first plate of the first tensioning member and the first plate of the second tensioning member form a single plate which extends facing the toothed wheel, and on either side of this toothed wheel, in the direction of displacement of the main body. Advantageously, these first plates form an abutment against the notched belt and thus make it possible to ensure that this notched belt remains in contact with the toothed wheel. According to this option, the second plate of the first tensioning member and the second plate of the second tensioning member, for their part, are distributed on either side of the toothed wheel, in the direction of displacement of the main body. In other words, these second plates of the first and second tensioning members both extend from the ring arranged around the toothed wheel but are furthermore physically spaced apart from one another, such that the toothed wheel extends in a space formed between these second plates, thereby making it possible to ensure that the rotation of the toothed wheel is not hindered and that this toothed wheel can engage against the notched belt. In other words, according to this option, the toothed wheel and the notched belt interact between the two second plates of the first and second tensioning members and this interaction is ensured, at least partially, by the first plates of these first and second tensioning members which form an end stop for this notched belt, thus preventing it from disengaging from the toothed wheel.

As mentioned above, the fixed guide means according to the first exemplary embodiment may comprise two notched belts, in which case the wiper system may then comprise up to four tensioning members, the first tensioning member and the second tensioning member being dedicated to tensioning a first notched belt in the two displacement directions mentioned above and a third tensioning member and a fourth tensioning member being dedicated to tensioning a second notched belt upstream of the main body in the first direction of displacement and the second direction of displacement, respectively, of this main body.

According to a second exemplary embodiment of the invention, the wiper system comprises the at least one fixed guide means for the main body, the blade rubber is configured to be pressed against a front face of the glazed surface, the at least one fixed guide means comprises at least one gutter formed on the front face of the glazed surface, and the member for setting in motion comprises at least the electric motor designed to drive the rotation of at least one rolling member received in the at least one gutter. Optionally, the fixed guide means may comprise two gutters distributed on either side of the glazed surface and the member for setting in motion may comprise at least two rolling members, each rolling member being received in one of the two gutters. Advantageously, according to this option, the two rolling members may be rotationally connected such that the electric motor drives the simultaneous rotation of these two rolling members, thus ensuring a smooth displacement of the main body along the glazed surface. It will be understood that this is only one exemplary embodiment, and that the member for setting in motion could comprise more than two rolling members without departing from the scope of the present invention.

According to one example of application of the invention, the at least one rolling member may for example take the form of a wheel. For example, this wheel may be a smooth wheel or a textured wheel.

According to this second exemplary embodiment of the invention, the pressing member for pressing the blade rubber is borne by the main body and comprises at least one hook which defines at least one housing in which a roller is received, the pressing member comprising at least one elastic return member which is stretched between two pins borne by the hook and is in contact with a shaft of the roller, this shaft of the roller being made movable along an oblong hole formed in an upper wall of the hook, which contributes to defining the housing, under a return effect of the elastic return member such that the blade rubber borne by the main body bears against the front face of the glazed surface.

According to any one of the exemplary embodiments mentioned above, the two opposite directions of displacement of the main body may for example be implemented by changing the direction of rotation of the electric motor of the embedded motorized member for setting in motion.

The present invention also relates to a driving assistance device comprising at least one detection module and at least one wiper system as mentioned above, the detection module comprising at least one driving assistance sensor and at least one glazed surface closing the detection module and protecting the at least one driving assistance sensor, the wiper system being configured to clean the glazed surface.

The present invention lastly relates to a motor vehicle comprising at least one driving assistance device as mentioned above.

BRIEF DESCRIPTION OF DRAWINGS

Further features, details and advantages will become more clearly apparent from reading the detailed description given below by way of indication and with reference to the various exemplary embodiments illustrated in the following figures.

DETAILED DESCRIPTION OF THE INVENTION

The features, variants and various embodiments of the invention may be combined with one another, in various combinations, provided that they are not mutually incompatible or exclusive. It will be possible, in particular, to imagine variants of the invention that comprise only a selection of the features described below, in isolation from the other features described, if this selection of features is sufficient to confer a technical advantage or to distinguish the invention from the prior art.

In the figures, the terms longitudinal, transverse, lateral, left, right, above and below refer to the orientation, with reference to a trihedron L, V, T, of a wiper system 100 according to the invention. Within this frame of reference, a longitudinal axis L represents a longitudinal direction, a transverse axis T represents a transverse direction, and a vertical axis V represents a vertical direction of the object in question. In the following description, the terms "wiper blade" and "blade" will be used interchangeably, as will the terms "wiper arm" and "arm".

Figure 1:
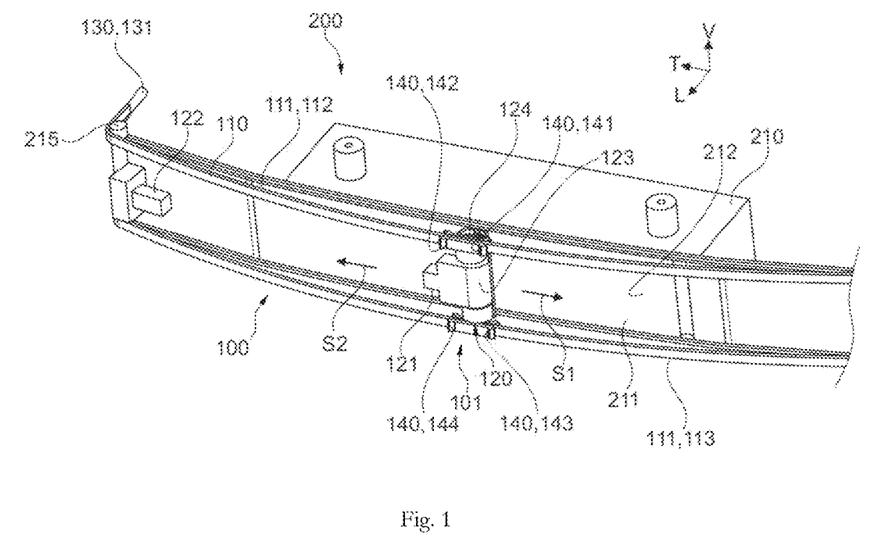
FIG. 1 illustrates a perspective view of a driving assistance device according to the invention, comprising at least one detection module and at least one wiper system according to a first exemplary embodiment of the invention.
Figure 2:
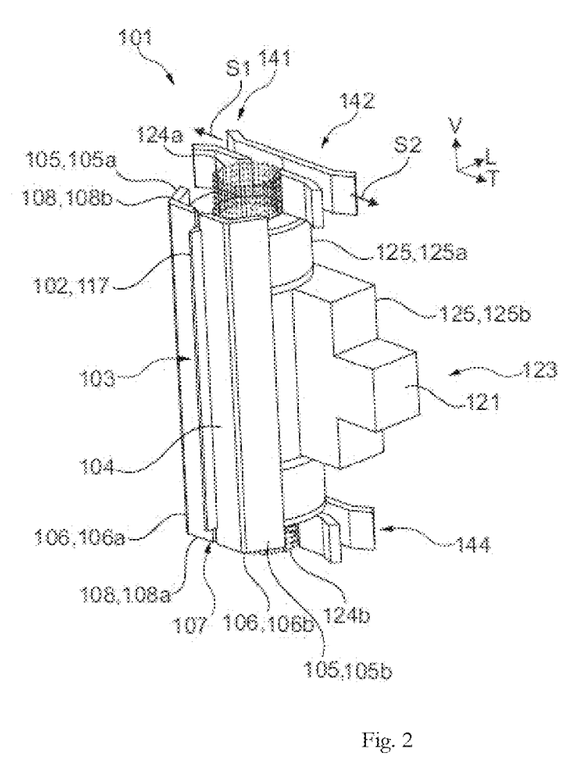
FIG. 2 illustrates a perspective view of a main body of the wiper system according to the first exemplary embodiment illustrated in FIG. 1.
Figure 3:
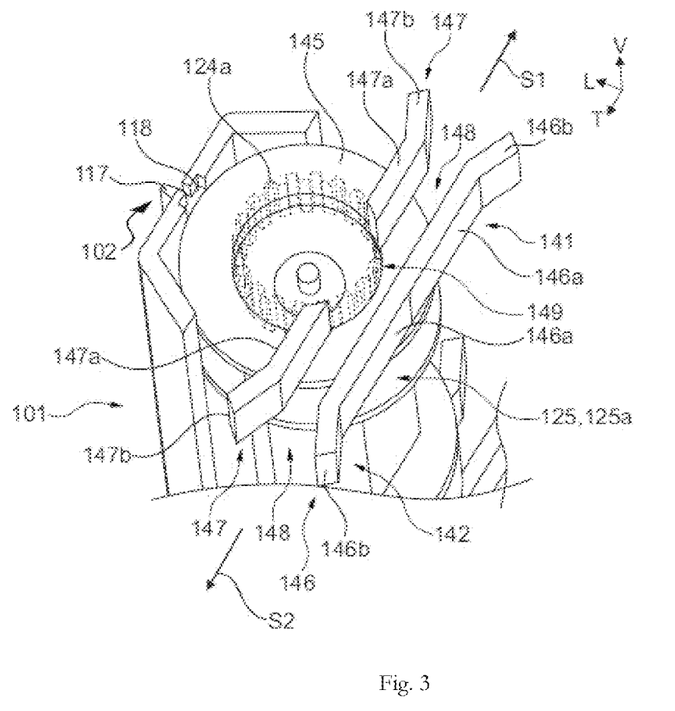
FIG. 3 illustrates a partial top view of the main body of the wiper system according to the first exemplary embodiment of the invention.
Figure 4:
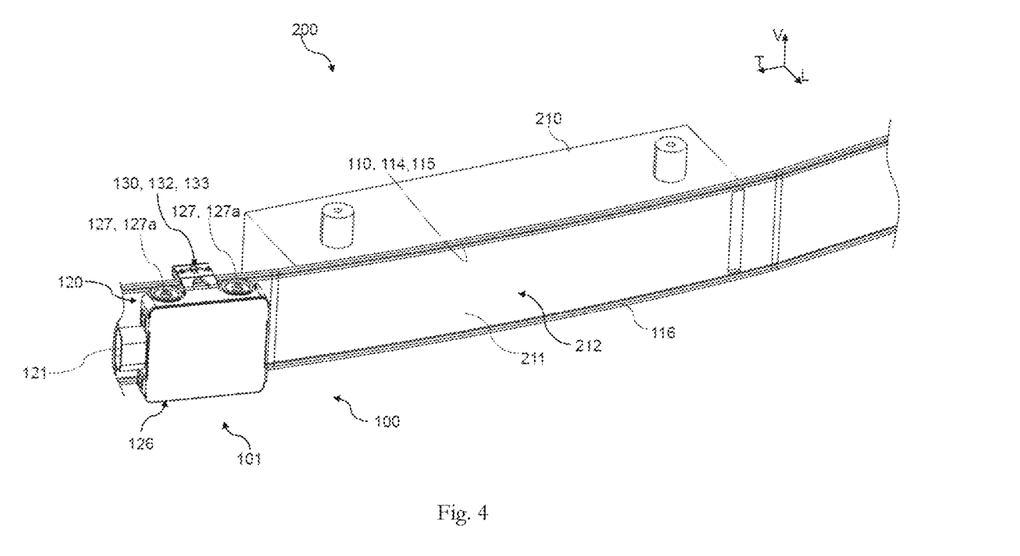
FIG. 4 illustrates a perspective view of a driving assistance device according to the invention, comprising at least one detection module and at least one wiper system according to a second exemplary embodiment of the invention, a main body of this wiper system comprising an enclosure closed by a cover.
Figure 5:
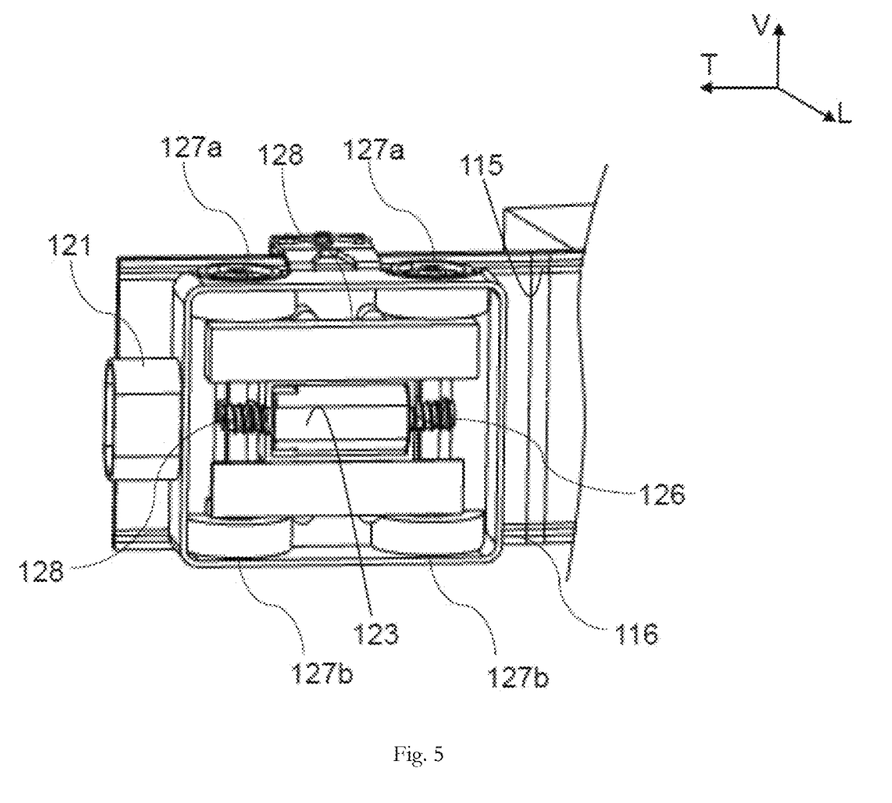
FIG. 5 illustrates a front view of the wiper system according to the second exemplary embodiment of the invention, the enclosure of the main body being without its cover here.
Figure 6:
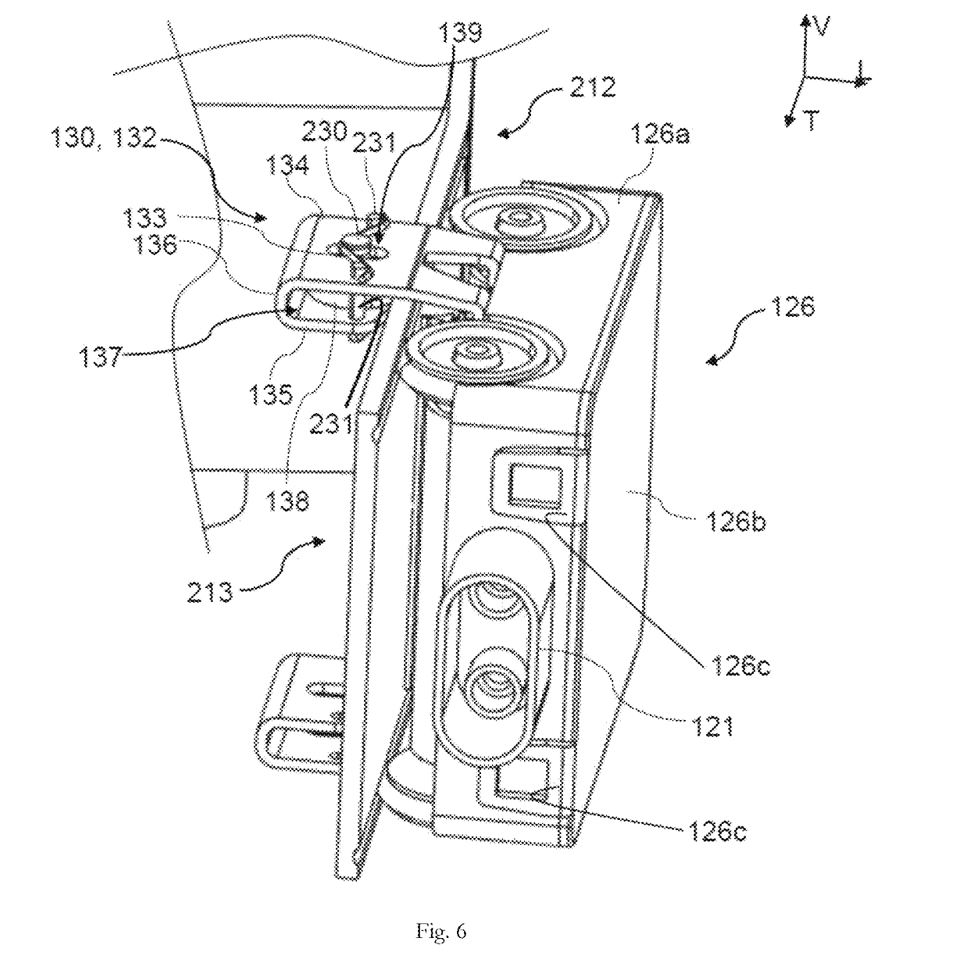
FIG. 6 illustrates a side view of the wiper system according to the second exemplary embodiment of the invention.

FIGS. 1 to 3 illustrate a wiper system 100 according to a first exemplary embodiment of the invention and FIGS. 4 to 6 illustrate the wiper system 100 according to a second exemplary embodiment of the invention. First of all, a description will be given of the features common to these two exemplary embodiments, before the features specific to each one are described in detail.

The figures illustrate a wiper system 100 applied to a driving assistance device 200. Such a driving assistance device 200 comprises at least one detection module 210 and at least one wiper device 100 according to the invention.

The detection module 210 comprises at least one driving assistance sensor—not visible in the figures—and at least one glazed surface 211 which closes the detection module 210 and thus protects the at least one driving assistance sensor. As shown, the wiper system 100 is more particularly intended to clean the glazed surface 211 of this detection module 210. It will be understood that this is only one exemplary embodiment, and that the wiper system could be used for cleaning other types of glazed surfaces without departing from the scope of the present invention. In this instance, "driving assistance sensor" is understood to mean a member configured to acquire data relating to surroundings external to the vehicle for which the driving assistance device 200 according to the invention is intended and to transmit the data thus acquired to a control unit, which for its part is configured to issue, as a result of this information received, one or more instructions to trigger or assist with a vehicle maneuver.

This driving assistance sensor may for example be a detection member using wave emission, for example electromagnetic wave emission, which is to say that this detection member is configured to evaluate a distance separating it from any object by measuring the time between an instant t at which it emits a wave and an instant t1 at which this wave is reflected. Thus, this detection member comprises at least one emitting member configured to emit at least one wave and at least one receiving member configured to receive the reflected wave. According to various exemplary embodiments of the present invention, these waves may be radioelectric waves, in which case the detection member is referred to as a RADAR (RAdio Detection And Ranging) member, or else light waves, for example a laser beam, in which case the detection member is referred to as an LIDAR (Light Detection And Ranging) member.

Since the decision making by the control unit is directly dependent on the data acquired by the driving assistance sensor, it will be understood that it is important for this driving assistance sensor to be able to operate optimally under all circumstances. Advantageously, the glazed surface 211 which closes the detection module 210 makes it possible to protect this detection module, and more particularly the driving assistance sensor of this detection module, notably from possible external attacks, for example from sprayed gravel, or other objects which may be present on the road. The wiper system 100 according to the invention, for its part, makes it possible to ensure that this glazed surface 211 is always clean, in order that the acquisition of images performed by the driving assistance sensor is not hindered.

This wiper system 100 comprises at least one main body 101, which is movable along the glazed surface 211, and at least one fixed guide means 110. The main body 101 comprises at least one blade rubber and at least one embedded motorized member 120 for setting in motion that is configured to drive a movement of the main body 101 along the at least one fixed guide means 110. In this case, "embedded motorized member for setting in motion" is understood to mean a member which is configured to drive the movement of an object and is displaced at the same time as this object. In this instance, the member 120 for setting in motion drives at least its own displacement as well as that of the main body 101 of which it is part, thus also driving the blade rubber likewise borne by this main body 101. More particularly, the blade rubber 102 is arranged facing the glazed surface 211 and the wiper system 100 comprises, advantageously, at least one pressing member 130 for pressing the blade rubber against this glazed surface 211.

According to the invention, the main body 101 is displaced in a linear movement, that is to say parallel to a straight line, facing the glazed surface 211. According to the examples illustrated in the figures, the main body 101 is displaced parallel to the transverse axis T of the trihedron illustrated. Since the motorized member 120 for setting in motion is embedded, it will be understood that this member 120 for setting in motion is also displaced in a linear movement, in this instance a linear movement parallel to the transverse axis T, facing the glazed surface 211. Advantageously, the control unit that receives the images acquired by the driving assistance sensor may be configured to process the images acquired during the phases of cleaning the glazed surface, that is to say during the phases in the course of which the main body and the embedded member for setting in motion travel in front of the glazed surface behind which is arranged this driving assistance sensor, in order to prevent the presence of this main body and of this embedded member for setting in motion from obscuring the sensor.

According to the examples illustrated, the member 120 for setting in motion comprises at least one electric motor 123 supplied with power by at least one electrical energy storage device 128. In this case, "electrical energy storage device" is understood to mean a device designed to accumulate electrical energy and then to return this electrical energy in order to drive the rotation of the electric motor 123.

In order to make it possible to charge the electrical energy storage device 128, the member 120 for setting in motion may advantageously comprise at least one connector 121 designed to be electrically connected to at least one charging terminal 122 of the wiper system 100, this charging terminal 122 itself being electrically connected to an external energy source, which is not illustrated here. Thus, when it is necessary to clean the glazed surface 211, a cleaning phase is initiated, that is to say that the member 120 for setting in motion is started up and consequently drives the displacement of the main body 101, and therefore of the blade rubber 102 that it bears, along this glazed surface 211 in order to clean it. According to the invention, the blade rubber is designed to clean the glazed surface 211 by sweeping it. In other words, the blade rubber, and therefore the main body 101 which bears this wiper blade, is designed to be displaced along the glazed surface 211 in at least two opposite displacement directions S1, S2. For example, changing the direction of displacement of the main body 101 may for example be implemented by changing the direction of rotation of the electric motor 123 of the embedded motorized member 120 for setting in motion.

Once the cleaning phase has finished, or on completion of a determined number of cleaning phases, the member 120 for setting in motion drives the displacement of the main body 101 so as to enable the connector 121 to engage with the charging terminal 122 and thus ensure that the electrical energy storage device is charged with a view to initiating a future cleaning phase. Advantageously, the charging terminal 122 may be arranged at a transverse end of the detection module 210, that is to say outside of a zone taken up by the glazed surface 211, such that, in the charging phase, the cleaning device 200 does not hinder the acquisition of images.

The cleaning phase may for example be commanded by the control unit of the driving assistance sensor. For example, when the driving assistance sensor detects the presence of dirt on the glazed surface 211, it may be configured to send corresponding information to the control unit, this control unit then being configured to issue an instruction to the member 120 for setting in motion, in order for the latter to be able to begin a cleaning phase. Once the dirt has been removed, the driving assistance sensor sends corresponding information to the control unit, which then issues an instruction to the member 120 for setting in motion to stop the cleaning phase. As has been mentioned, the latter may then drive the main body to a position referred to as "parking" position, in which its connector 121 is hooked up to the charging terminal 122. It will be understood that this is only an exemplary embodiment of the invention and that the cleaning phase could be commanded by the user of the vehicle themselves, or by a sensor and/or an independent control unit, without departing from the scope of the invention, or else even be triggered and stopped at specific intervals, and/or when the vehicle stops, independently of the detection of dirt.

According to an exemplary embodiment which is not illustrated here, the wiper system may have no charging terminal 122, it then being necessary for the electrical energy storage device to be either changed or charged independently of the vehicle.

With reference to FIGS. 1 to 3, the wiper system 100 according to a first exemplary embodiment of the invention will now be described.

FIG. 1 thus illustrates a perspective view of the detection module 210 equipped with the wiper system 100 according to the first exemplary embodiment of the invention. More particularly, this FIG. 1 illustrates the wiper system 100 during a phase of cleaning the glazed surface 211 of this detection module 210.

According to this first exemplary embodiment, the fixed guide means 110 comprises at least one notched belt 111. According to the example illustrated, the fixed guide means 110 more particularly comprises two notched belts 112, 113 which are vertically distributed on either side of the glazed surface 211. A distinction is thus made between an upper notched belt 112 and a lower notched belt 113. In other words, the two notched belts 112, 113 are distributed on either side of the glazed surface 211 in a vertical direction which is perpendicular to the transverse direction in which the main body 101 and the member 120 for setting in motion are displaced.

The member 120 for setting in motion, for its part, comprises at least the electric motor 123, and at least one toothed wheel 124 designed to be driven in rotation by the electric motor 123 and to engage with the notches of at least one of the notched belts 111. According to the example illustrated, the member 120 for setting in motion comprises two toothed wheels 124, at least one upper toothed wheel being designed to engage with the notches of the upper notched belt 112 and at least one lower toothed wheel being designed to engage with the notches of the lower notched belt 113. According to the invention, each toothed wheel 124 and the notched belt 111 with which it engages have dimensions such that these parts can mesh in a rack-and-pinion type connection.

As mentioned above, the blade rubber 102 is arranged facing the glazed surface 211. The toothed wheels 124 are driven in rotation by the electric motor 123, this rotation making it possible for these toothed wheels 124 to be displaced along each of the notched belts 111, which for their part are fixed. The blade rubber 102 and the member 120 for setting in motion 120 are both part of the main body 101 of the wiper system 100, the displacement of the toothed wheels 124 of this member 120 for setting in motion, along the notched belts 111, also drives the displacement of the wiper blade linearly along the glazed surface 211. As will be described in detail below, the action of the pressing member 130 makes it possible to ensure the contact of this blade rubber against the glazed surface 211, such that the blade rubber can wipe the glazed surface 211 and thus clear it of dirt possibly disposed there. More particularly, the blade rubber 102 is arranged in contact with a front face 212 of this glazed surface 211.

According to the first exemplary embodiment of the invention, the pressing member 130 for pressing the blade rubber takes the form of at least one elastic return device 131 designed to press the notched belt(s) 111 against the glazed surface 211. More particularly, each notched belt 111 is wound at least partially around a return element, for example a pulley, in this case borne by a rod 215, that has at least one free end which extends toward the inside of the vehicle equipped with the wiper system according to the invention, that is to say going away from the front face 212 of the glazed surface 211. As shown, the elastic return device 131 is fixed at this free end.

According to the example illustrated here, the pressing member 130 more particularly comprises at least one first elastic return device 131 which tends to press the upper notched belt 112 against the glazed surface 211 and at least one second elastic return device—not visible here—which tends to press the lower notched belt 113 against this glazed surface 211. For example, the first and/or the second elastic return devices 131 may each take the form of a traction spring which tends to draw the free end of the notched belt in question toward the inside of the vehicle.

The notches of these notched belts 111 face the glazed surface 211 and the toothed wheels 124 which engage with these notches are thus interposed between the glazed surface 211 and the notched belt 111 in question. The result of this arrangement is that the pressing of the notched belts 111 against the glazed surface 211, brought about by the elastic return members 131 mentioned above, makes it possible indirectly to press the main body 101, and particularly the blade rubber borne by this main body 101, against the glazed surface 211.

In order to ensure a smooth and continuous displacement of these toothed wheels 124 along these notched belts 111 and thus avoid hindering the acquisition of images by the driving assistance sensor during the phases of cleaning the glazed surface 211, these notched belts 111 must be stretched to form a straight portion, similar to a rack, extending parallel to a direction of displacement of the toothed wheels 124, at least upstream of these toothed wheels 124 with respect to their displacement direction. To that end, the wiper system 100 comprises at least one tensioning member 140 associated with each of its notched belts 111.

In the example illustrated, as can be seen notably in FIG. 2, the wiper system 100 comprises at least one first tensioning member 141 designed to ensure the tensioning of the upper notched belt 112 in a first direction of displacement S1 of the main body 101, at least one second tensioning member 142 designed to ensure the tensioning of the upper notched belt 112 in a second direction of displacement S2 of the main body 101, at least one third tensioning member 143 designed to ensure the tensioning of the lower notched belt 113 in the first direction of displacement S1 of the main body 101, and at least one fourth tensioning member 144 designed to ensure the tensioning of the lower notched belt 113 in the second direction of displacement S2 of the main body 101. These tensioning members are described in more detail below with reference to FIG. 3.

FIG. 2 illustrates a perspective view of the main body 101 of the wiper system according to the first exemplary embodiment of the invention. More particularly, this FIG. 2 illustrates the main body 101 seen from the glazed surface and thus makes the blade rubber 102 visible. As shown, this blade rubber 102 is borne by a base 103, which itself is secured to the main body 101. This base 103 comprises at least one main wall 104 and at least two flanges 105, each of which extends from a transverse edge 106 of the main wall 104. "Transverse edge" of the main wall 104 is understood to mean an edge which delimits the transverse dimension, along the transverse axis T of the trihedron illustrated, of this main wall 104. Thus, a first flange 105a extends from a first transverse edge 106a of the main wall 104 and a second flange 105b extends, for its part, from a second transverse edge 106b of this main wall 104.

The main wall 104 has at least one slot 107 which extends in a vertical direction parallel, or substantially parallel, to each of the transverse edges 106 of the main wall 104 and which receives the blade rubber 102. According to the example illustrated here, this slot 107 extends over the entire height of the main wall 104 of the base 103, that is to say over the entire dimension of this main wall 104 measured parallel to the vertical axis V, between two vertical edges 108 of this main wall 104. In other words, in the example illustrated, this slot 107 opens on a lower vertical edge 108a and on an upper vertical edge 108b of this main wall 104. Advantageously, such a configuration makes it possible to replace the blade rubber 102 when it is excessively worn so as to ensure effective cleaning of the glazed surface to be cleaned. As an alternative, the slot may open only on one or the other of the vertical edges of the main wall of the base, without departing from the scope of the present invention.

For example, the blade rubber 102 comprises a heel and wiping lip 117 connected together by a hinge. The wiping lip 117 forms that part of this blade rubber 102 that is designed to come into contact with the glazed surface to be wiped, and the heel ensures the blade rubber 102 is held on the base 103. Optionally, means for locking the heel in position against an internal face of the main wall 104 of the base 103 may be provided to avoid inadvertent vertical displacement of the blade rubber 102 with respect to the main body 101. The wiping lip 117 is for example visible in FIGS. 2 and 3, and the heel 118, for its part, is visible only in FIG. 3. The hinge formed between the heel and the wiping lip allows this wiping lip 117 to flex and consequently makes it possible to sweep the glazed surface to be wiped in the two opposite directions mentioned above.

It will be noted that the flanges 105 of the base 103 extend on either side of a casing 125 of the electric motor 123. More particularly, these flanges 105 extend on either side of a first portion 125a of the casing 125, which houses at least one stator and at least one rotor, the stator being for example formed by a metallic body around which is wound at least one coil configured, when it is supplied with electricity, to generate a magnetic field able to drive the rotation of the rotor. The rotor, for its part, is rotationally connected to the toothed wheels 124. In other words, the upper toothed wheel 124a and the lower toothed wheel 124b are driven in rotation at the same time, thus ensuring a smooth and even displacement of the main body 101 of the wiper system 100. Such a movement advantageously makes it possible not to hinder the acquisition of images performed by the driving assistance sensor of the detection module equipped with the wiper system according to the invention, the associated control unit being thus better able to erase the main body from each acquired image by suitable image processing. The acquisition of images is thus made more reliable, thus ensuring the safety of the users of the vehicle equipped with this detection module.

The casing 125 also comprises at least one second portion 125b which houses the electrical energy storage device and which also protects the connector 121 which makes it possible to electrically connect this storage device to the charging terminal described above. For example, the casing 125 may be in one piece, that is to say that it can form a single assembly which cannot be separated without causing damage to the first portion 125a and/or the second portion 125b of this casing 125.

As mentioned above, the wiper system 100 according to the first exemplary embodiment of the invention comprises four tensioning members 140 for tensioning the notched belts. These tensioning members 140 are configured to ensure a minimum level of tension of these notched belts in order to ensure smooth displacement of the main body 101 along the guide means formed by these notched belts, in a meshing configuration of rack-and-pinion type. As a consequence, the first tensioning member 141 and the second tensioning member 142 are arranged in the vicinity of the upper toothed wheel 124a, whereas the third tensioning member 143 and the fourth tensioning member 144, for their part, are arranged in the vicinity of the lower toothed wheel 124b.

FIG. 3 is a partial top view of the main body 101 of the wiper system 100 according to the first exemplary embodiment and particularly clearly shows the first tensioning member 141 and the second tensioning member 142 for tensioning the upper notched belt, which is not shown in FIG. 3. As mentioned above, the first tensioning member 141 and the second tensioning member 142 for tensioning the upper notched belt are distributed on either side of the upper toothed wheel 124a, in the direction of displacement of the main body of the wiper system. Thus, in the first direction of displacement S1 of the main body, the first tensioning member 141 is arranged upstream of the upper toothed wheel 124a and the second tensioning member 142 is arranged downstream of this upper toothed wheel 124a, whereas, in the second direction of displacement S2 of the main body, the first tensioning member 141 is arranged downstream of the upper toothed wheel 124a and the second tensioning member 142 is arranged upstream of this upper toothed wheel 124a These tensioning members 141, 142 both extend from a ring 145 arranged around the upper toothed wheel 124a. For example, this ring 145 can be secured to the casing 125 of the electric motor, and more particularly to a vertical end of the first portion 125a of this casing 125. The first tensioning member 141 and the second tensioning member 142 each comprise at least one first plate 146 and at least one second plate 147, which are spaced apart so as to form a receiving zone 148 for receiving the upper notched belt.

The first plate 146 and the second plate 147 of each of these tensioning members 141, 142 comprise at least one straight portion 146a, 147a, respectively, and at least one inclined portion 146b, 147b, respectively. In the example illustrated, each inclined portion 146b, 147b continues the straight portion 146a, 147a of the corresponding plate 146, 147. The straight portions 146a, 147a extend in two parallel transverse straight lines, whereas the inclined portions 146b, 147b extend away from one another. These inclined portions 146b, 147b thus form a guide member for guiding the upper notched belt which makes it possible to guide this notched belt toward that portion of the receiving zone 148 that is delimited by the straight portions 146a, 147a of each of the plates 146, 147. Once in the receiving zone 148, the longitudinal movements, that is to say the movements parallel to the longitudinal axis L, of the upper notched belt are limited by the straight portions 146a, 147a of each of the plates 146, 147. It is thus ensured that the upper notched belt is straight at least upstream of the main body 101, in a direction of displacement of this main body 101 along this upper notched belt.

As mentioned above, the first tensioning member 141 is arranged upstream of the upper toothed wheel 124a in the first direction of displacement S1 of the main body 101 and the third tensioning member 143, for its part, is arranged upstream of the upper toothed wheel 124a in the second direction of displacement S2 of the main body 101.

According to the exemplary embodiment illustrated here, the first plates 146 of the first and second tensioning members 141, 142 are in one piece, that is to say that they form a single assembly which cannot be separated without causing damage to at least one of these plates 146. By contrast, the second plates 147 of these first and second tensioning members 141, 142 are distinct and remote from one another. More particularly, at least one space 149 is thus formed between the two second plates 147 of these tensioning members 141, 142, the upper toothed wheel 124a extending through this space 149, between these second plates 147.

Advantageously, the upper toothed wheel 124a thus extends, in this illustrated example, between the two second plates 147 and engages with the upper notched belt facing the space 149 formed between these two second plates 147.

In other words, a meshing zone between the upper toothed wheel 124a and the upper notched belt is thus formed facing the space 149 created between the two second plates 147. The first plates 146 of the first and second tensioning members 141, 142, for their part, form a single assembly and meet in this meshing zone. Advantageously, the join between the first plates 146 of the first and second tensioning members 141, 142 thus forms a stop zone for the upper notched belt which contributes to ensuring that the upper toothed wheel 124a can engage with the upper notched belt.

The third and fourth tensioning members 143, 144 for tensioning the lower notched belt 113 are structurally identical to the first and second tensioning members 141, 142, such that the description that has just been given can be reapplied directly to these third and fourth tensioning members, except for the fact that these third and fourth tensioning members are arranged in the vicinity of the lower toothed wheel and make it possible to ensure that the lower notched belt is tensioned.

As mentioned above, this FIG. 3 also clearly shows the wiping lip 117 and the heel 118 of the blade rubber 102.

With reference to FIGS. 4 to 6, the wiper system according to the second exemplary embodiment of the invention will now be described in more detail.

According to this second exemplary embodiment, the fixed guide means 110 takes the form of at least one gutter 114 formed in the thickness of the glazed surface 211. In other words, according to this second exemplary embodiment, the fixed guide means 110, which is part of the wiper system 100, is formed on the glazed surface 211. According to the example illustrated, the fixed guide means 110 more particularly takes the form of at least one upper gutter 115 and at least one lower gutter 116 which are distributed on either side of the glazed surface 211 to be cleaned, along the vertical axis V, that is to say along a direction perpendicular to the direction of displacement of the main body 101 along the glazed surface 211. The main body 101 of the wiper system 100 according to this second exemplary embodiment comprises at least one enclosure 126 which houses, at least, the electric motor and the electrical energy storage device.

The member 120 for setting in motion, for its part, comprises the electric motor and at least one rolling member 127, advantageously a plurality of rolling members 127, designed to be driven in rotation by the electric motor. According to the example illustrated, the member 120 for setting in motion comprises at least four rolling members 127 received in pairs in the two gutters 114 of the fixed guide means 110. Thus, a distinction is made between two upper rolling members 127a received in the upper gutter 115 and two lower rolling members—not visible in FIG. 4—received in the lower gutter 116. More particularly, the edges which delimit each of the gutters 114 mentioned above make it possible to guide these rolling members 127 so as to enable the displacement of the main body 101, and therefore of the blade rubber borne by this main body 101, along the glazed surface 211 to be cleaned. For example, these rolling members 127 may take the form of smooth or textured wheels. In the remainder of the description, the terms "rolling member 127" and "wheel 127" are used interchangeably.

The pressing member 130 for pressing the main body 101, and therefore the blade rubber that it bears, against the glazed surface 211 comprises, according to this second exemplary embodiment, at least one hook 132 equipped with at least one elastic return member 133. The structure and the operation of this pressing member 130 is described in more detail below, with reference to FIG. 6.

FIG. 5 illustrates the main body 101 of the wiper system 100 according to the second exemplary embodiment, in which a cover of the enclosure 126 of this main body 101 has been removed. This FIG. 5 thus clearly shows the electric motor 123 and the electrical energy storage device 128 which makes it possible to supply power to this electric motor 123. Although it is not shown, at least one electrical connection member, for example a cable, makes it possible to connect the electrical energy storage device 128 to the connector 121 described above.

The wheels 127 are rotationally connected in pairs, thus creating two pairs of wheels, each made up of one of the upper wheels 127a and one of the lower wheels 127b. The wheels 127 of one and the same pair are linked via an axle that bears a toothed pinion in its center, substantially equidistant from the wheels.

The electric motor 123 is similar to the electric motor described above and the rotor in this case is connected to at least one endless screw, advantageously two endless screws disposed on either side of the rotor, which is configured to interact with the toothed pinion borne by the axle associated with one pair of wheels. Setting an endless screw in rotation rotates the axle via the toothed pinion and therefore rotates the wheels associated with the axle. In the same way as above, driving the upper wheels 127a at the same time as driving the lower, smooth wheels 127b makes it possible to ensure an even and smooth movement of the main body 101, thereby contributing to ensuring that the driving assistance sensor of the detection module equipped with the wiper system according to the invention continuously acquires images.

FIG. 6, for its part, illustrates a side view of the main body 101 of the wiper system 100 according to the second exemplary embodiment of the invention.

As shown, the enclosure 126 comprises at least one substantially parallelepipedal base 126a which is open on at least one face, this open face being closed by the cover 126b. As shown, this cover 126b is held on the base 126a by virtue of at least two fixing tabs 126c distributed on either side of the connector 121. Advantageously, at least two other fixing tabs are also arranged on the other side of the base 126a.

This FIG. 6 also clearly shows the pressing member 130 for pressing the main body 101. As mentioned above, this pressing member 130 comprises, according to the second exemplary embodiment, at least one hook 132 which extends from the base 126a of the enclosure 126. More particularly, this hook 132 comprises at least one upper wall 134, which starts between the upper, smooth wheels 127a, and at least one lower wall 135, which walls are connected to one another by at least one curved wall 136. The walls 134, 135, 136 of the hook 132 define a housing 137 in which is received at least one roller 138 which bears against a lower face 213 of the glazed surface 211, that is to say a face of this glazed surface 211 facing in the opposite direction to the front face 212 of this glazed surface 211. In other words, in the vicinity of an upper edge 214 of the glazed surface 211, this glazed surface 211 is sandwiched between the roller 138 and the upper wheels 127a.

An oblong hole 139 is formed in the upper wall 134 of this hook 132 and a shaft 230 of the roller 138 extends through this oblong hole 139. At least two pins 231 also connect the lower wall 135 and the upper wall 134 of the hook 132, these two pins 231 extending respectively beyond the upper wall 134 away from the lower wall 135.

As shown, the elastic return member 133 is arranged between the two pins 231, bearing against the shaft 230 of the roller 138. The elastic return member 133 is thus under tension and tends to return to its initial position, thus generating a force on the two pins 231 of the hook 132 that tends to move the main body 101, and therefore the blade rubber that it bears, close to the front face 212 of the glazed surface 211. It is thus ensured that the blade rubber is always in contact with the glazed surface 211 to be cleaned.

It will be understood from the above text that the present invention proposes a wiper system for a glazed surface, for example a detection module, which ensures effective cleaning of this glazed surface while still having reduced bulk in relation to the wiper systems currently in use.

However, the present invention is not limited to the means and configurations described and illustrated in the present document, but also extends to any equivalent means or configuration and to any technically functional combination of such means. In particular, the form and disposition of the pressing members for pressing the blade rubber against the glazed surface, of the fixed guide means, and of the members for setting in motion may be modified without detriment to the invention, provided that they perform the functions described above.

What is claimed is:

1. A wiper system for a glazed surface, comprising
a main body which includes a blade rubber designed to come into contact with the glazed surface;
a motorized member for providing actuating motion, with the motorized member being configured to drive a linear movement of the main body along the glazed surface;
the motorized member including an electric motor and a toothed wheel, the toothed wheel in engagement with a notched belt; and
a pressing member for pressing the blade rubber against the glazed surface, the pressing member being borne by the notched belt.

2. The wiper system of claim 1, wherein the motorized member includes
the electric motor, wherein the main body includes an electrical energy storage device configured to supply electrical energy to the electric motor.

3. The wiper system of claim 2, wherein the main body includes a connector electrically connected to the electrical energy storage device, and wherein the wiper system further includes a charging terminal configured to be electrically connected to the connector.

4. The wiper system of claim 1, wherein the pressing member takes the form of an elastic return device designed to press the notched belt against the glazed surface.

5. The wiper system of claim 1, further including
a fixed guide means for the main body, wherein the fixed guide means is formed by the notched belt; the toothed wheel designed to be driven in rotation by the electric motor.

6. The wiper system of claim 5, wherein the pressing member includes an elastic return device designed to stretch the notched belt, and wherein the toothed wheel in engagement with the notched belt is arranged between the notched belt and the glazed surface.

7. The wiper system of claim 5, further including a tensioning member for tensioning the notched belt, which tensioning member is arranged upstream of the toothed wheel with respect to a direction of displacement of the main body along the glazed surface.

8. The wiper system of claim 1, further including a fixed guide means for the main body, wherein the blade rubber is configured to be pressed against a front face of the glazed surface, wherein the fixed guide means includes a gutter formed on the front face of the glazed surface, and wherein the member for setting in motion includes the electric motor designed to drive the rotation of a rolling member received in the gutter.

9. The wiper system of claim 8, further including the pressing member for pressing the blade rubber against the glazed surface;
the pressing member being borne by the main body includes a hook which defines a housing in which a roller is received;
the pressing member including an elastic return member, which is stretched between two pins borne by the hook and is in contact with a shaft of the roller;
the shaft of the roller configured to be movable along an oblong hole formed in an upper wall of the hook, which contributes to defining the housing, under a return effect of the elastic return member such that the blade rubber borne by the main body bears against the front face of the glazed surface.

10. A driving assistance device comprising:
a detection module and a wiper system, wherein the detection module includes a driving assistance sensor and
a glazed surface closing the detection module and protecting the driving assistance sensor, and
the wiper system including a main body, which includes a blade rubber adapted to contact the glazed surface and a motorized member for providing actuating motion, with the motorized member being configured to drive a linear movement of the main body along the glazed surface;
the motorized member including an electric motor and a toothed wheel, the toothed wheel in engagement with a notched belt; and
a pressing member for pressing the blade rubber against the glazed surface, the pressing member being borne by the notched belt.

* * * * *